Aug. 26, 1969   JAN-THEODOR OLINK   3,463,625
PROCESS AND APPARATUS FOR THE PRODUCTION OF FLAT GLASS
Filed July 10, 1967   2 Sheets-Sheet 2
Fig. 3
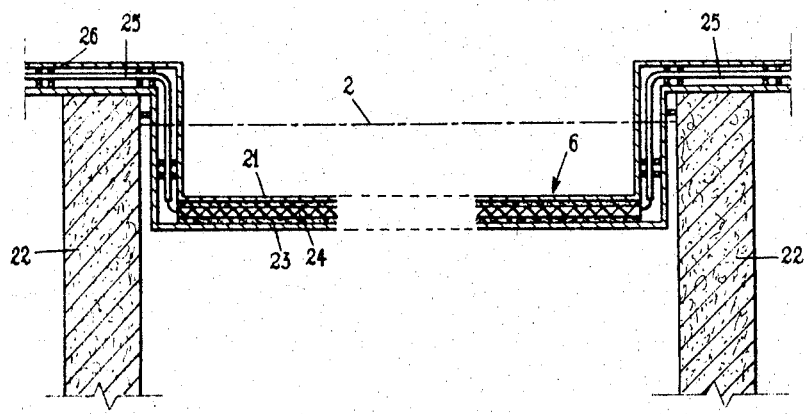
Fig. 4
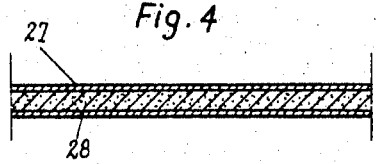
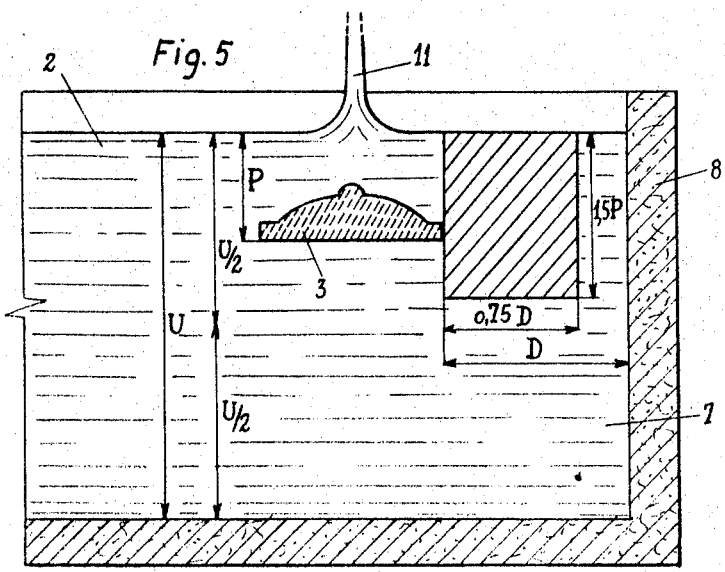
INVENTOR
JAN-THEODOR OLINK
BY Young + Thompson
ATTYS.

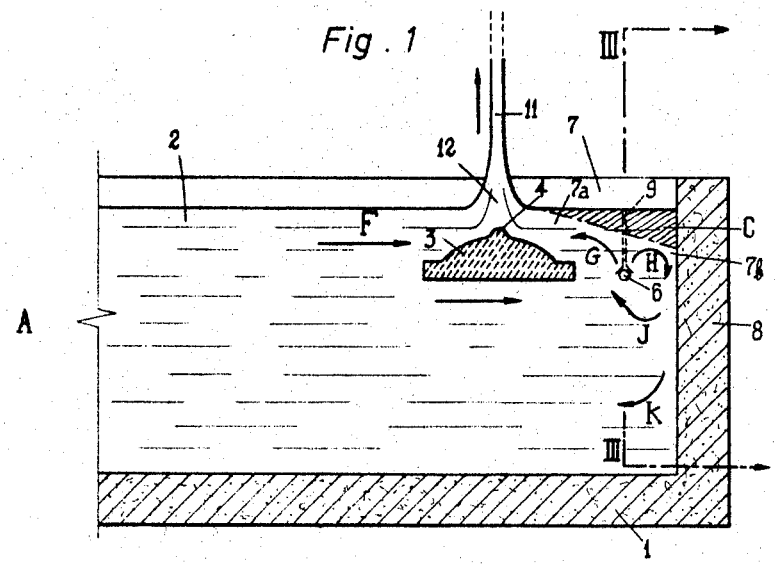
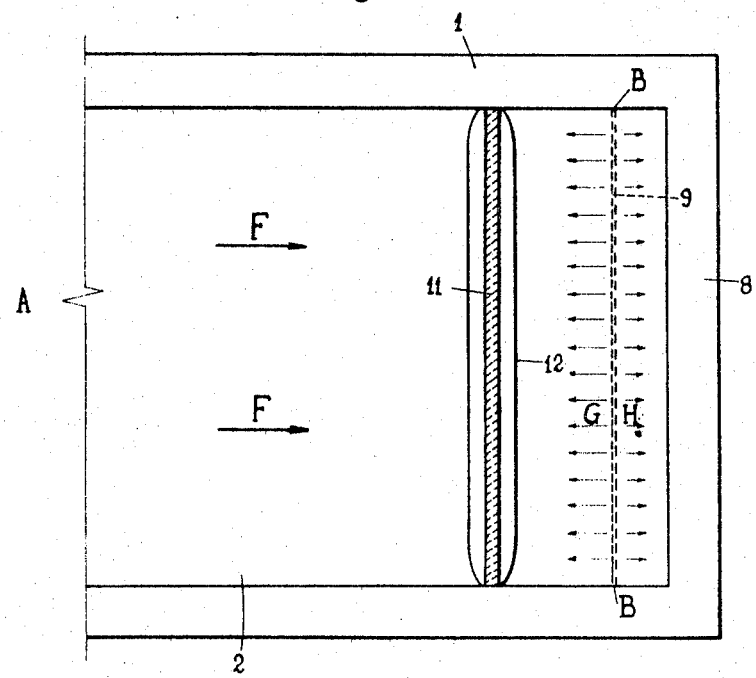

United States Patent Office 3,463,625
Patented Aug. 26, 1969

3,463,625
PROCESS AND APPARATUS FOR THE PRODUCTION OF FLAT GLASS
Jan.-Theodor Olink, Asnieres, France, assignor to Boussois-Souchon-Neuvesel, Paris, France, a company of France
Filed July 10, 1967, Ser. No. 652,232
Claims priority, application France, July 15, 1966, 69,514
Int. Cl. C03b *15/04*
U.S. Cl. 65—90         6 Claims

ABSTRACT OF THE DISCLOSURE

Process and installation for the production of flat glass by vertical drawing of a sheet of glass starting from a bath of molten glass contained in a drawing kiln. The process comprises a supplementary heating of the bath of glass situated in the part of the drawing kiln termed the end part, characterized in that the said heating extends substantially full width of the kiln and is localized in such a way as to produce, within the end part and in the upper portion of this latter, a substantially vertical thin zone of hotter glass with lower viscosity, constituting a curtain separating a further glass current from a return current.

---

This invention relates to a process for the production of flat glass by the drawing method generally known as the Pittsburgh process, and an apparatus for applying this process.

As is known, the Pittsburgh process consists of drawing a sheet of glass from a mass of molten glass. A draw-bar, or debiteuse, immersed in the mass of molten glass determines the vertical plane of drawing of the sheet. In this process the tank containing the molten material, termed the drawing kiln, is bounded, on the side opposite the point of arrival of the molten glass coming from the furnace, by a wall of refractory material forming a closed part termed the "end part."

In the Pittsburgh process the currents or ribbons of glass coming from the furnace separate at the level of the debiteuse into two currents, one, termed the direct current, feeding directly the meniscus or foot of the sheet passing above the debiteuse, while the other passes around the debiteuse to feed the meniscus on its rear surface. A part of this latter current, under the effect of cooling by the wall of the end part, plunges towards the bottom of the kiln and returns behind, forming what is termed the "return current."

It is known that in the Pittsburgh process the condition of the glass currents in the end part is complex and has certain peculiar features which might become disadvantageous under certain conditions of operation. Particularly in the actual existing processes, the following difficulties are encountered:

(a) The return current opposes the current feeding the rear of the sheet and interferes with its circulation.

(b) On the other hand the current feeding the rear of the meniscus opposes the return current.

These phenomena are the cause of numerous inconveniences:

(1) The speed of the currents in the end part is low and the glass in the end part, under the influence of the effect of the walls, cools and there is a danger of its devitrifying. There thus forms in the end part a mass of devitrified glass the thickness of which increases towards the end wall of the drawing kiln, rendering the circulation of the glass even more difficult.

(2) Because the current feeding the rear of the meniscus is considerably slowed down by the return current and by the layer of cold glass attached to the wall of the end part, the glass stays longer above the debiteuse and there is danger of its devitrifying.

(3) For the same reason the rate of flow of the glass feeding the rear of the meniscus is considerably below that fed by the direct current, which causes a reduction in the drawing speed.

(4) The meniscus which is attached to the wall of the end part by the cold glass suffers a deformation, curving in towards the end part, which interferes with the satisfactory progress of operations.

(5) Relative to the vertical plane of symmetry of the drawing element, the meniscus suffers a deformation by thickening on the side of the end part, and this dissymmetry may cause a displacement of the meniscus.

(6) The surface separating the return current and the current feeding the rear of the meniscus deviates markedly from the ideal vertical plane. This gives irregular contours to the meniscus and tends to degrade the surface of the drawn sheet.

It is known that some of these drawbacks, caused by the interaction between the return current and the current feeding the rear of the meniscus, can be compensated for. Thus, it is possible to diminish the tendency to devitrification by heating fairly energetically the mass of glass in the rear end part by means of electrical resistors or electrodes, placed quite near the walls. However, no process is known which obviates all the drawbacks mentioned above.

The object of the improvements to which this invention relates is to remedy all these defects by acting on their common cause, that is to say the interaction between the return current and the current feeding the rear side of the meniscus.

According to the invention the process for the manufacture of flat glass by vertical drawing of a sheet of glass starting from a bath of molten glass contained in a drawing kiln and having a supplementary heating of the bath of glass situated in the part of the drawing kiln termed the end part, is characterized in that this heating is localized in such a way as to create within the end part and in the upper portion of this latter a substantially vertical thin zone of hotter glass with lower viscosity, forming a curtain separating the debiteuse from the end wall of the end part.

The thin separating curtain of hotter glass thus produced in a given zone of the end part has a specific part to play which is very favourable for the drawing conditions, as will be explained later.

Preferably the hot thin curtain of glass is produced parallel to the debiteuse or drawbar and at a horizontal distance from this less than three-quarters of the distance separating the debiteuse from the end wall of the end part, the said thin curtain extending to a depth not more than 1.5 times that of the lower surface of the debiteuse. In practice the horizontal distance between the thin curtain or zone and the debiteuse is between 10 and 25 cm., while the depth of the thin zone is between 5 and 40 cm.

Also in accordance with the invention the flat glass drawing installation comprising a debiteuse or drawbar used for the formation of the meniscus, immersed in the bath of glass of a drawing kiln, parallel to the end wall of this latter, this installation having a heating bar immersed in the end part of the drawing kiln, is characterized in that the heating bar is immersed in the bath of glass at a horizontal distance from the debiteuse less than three-quarters of the horizontal distance separating the debiteuse from the end wall of the end part and at the same time at a depth not exceeding one and a half times the depth of immersion of the lower wall of the debiteuse.

In practice this heating bar is immersed in the glass at a horizontal distance from the debiteuse between 10 and 25 cm. and at a depth between 5 and 40 cm.

In particular, the heating bar consists advantageously of a refractory tube of low diameter in which is accommodated an electrical resistor fed with current in such a way as only to pass through a low calorific power per unit of length.

Specific embodiments of the invention will now be described by way of example with reference to the accompanying drawings, in which:

FIGURE 1 is a part longitudinal section of a drawing kiln arranged in accordance with the invention, FIGURE 2 is the corresponding plan, FIGURE 3 is a part cross section on a larger scale along III—III in FIGURE 1, FIGURE 4 is a view in longitudinal section of a portion of a modified heating tube, and FIGURE 5 is a similar diagram to FIGURE 1, showing the positioning of the heating bar.

Referring to FIGURES 1 and 2 of the attached drawings, there can be seen at 1 the drawing kiln constituting the end portion of a melting tank (not shown) situated at A.

The kiln 1 contains a bath of molten glass 2 which moves in the direction of arrow F (direct current) towards a debiteuse or drawbar 3 which is immersed in the bath 2. The debiteuse is fixed by means not shown and extends from one side of the kiln to the other. A sheet 11 is drawn from the bath at the median plane 4 of the debiteuse and has a meniscus 12.

A transverse heating bar 6 is arranged in the kiln 1, parallel to the debiteuse 3. The bar 6 is accommodated in the part 7 of the kiln, termed the end part, which extends between the debiteuse 3 and the end wall 8 of the kiln 1.

The position of the heating bar 6 in the end part depends on certain critical conditions connected with the position of the debiteuse in the end part, if it is desired to obtain all the specific technical results to which the invention is directed.

If by D (FIGURE 5) is designated the horizontal distance separating the rear portion of the debiteuse 3 from the rear wall, by U the depth of the end part, and by P the depth of the lower surface of the debiteuse 3, the heating bar 6 should be placed inside the shaded rectangular zone whose sides are 0.75 D and 1.5 P respectively.

In practice U is equal to about 1.40 m., P 0.35 m. and D 0.80 m. and the bar 6 is generally situated at a distance from the debiteuse 3 between 10 and 25 cm. and at a depth between 5 and 40 cm.

The heating bar 6 generates in the vitrous molten mass a calorific energy such that the glass only presents on contact a small rise in temperature relative to the ambient mass, the energy supplied for this purpose to the bar 6 being itself low (for instance, 0.3 to 2 kw. per metre length). Consequently the rise in temperature imparted to the glass is about from 5 to 10° C., the ambient mass being for instance at a temperature of about 990° C.

The localized heating thus produced in the end part 7 causes from one side of the kiln 1 to the other the formation of a thin rising vertical layer or zone or curtain 9 of hot glass forming a curtain which opens out at the surface of the bath.

The zone 9 formed by glass of reduced viscosity separates the end part 7 into two separate zones 7a, 7b.

The means thus provided result in a plurality of beneficial effects of a surprising nature, having regard to the simplicity of these means and to the small quantity of energy consumed.

The following are some of these technical effects:

(a) The sheet 9 of less viscous glass favours the vertical ascent of the molten glass towards the meniscus 12 in the direction of the arrow G. The feed of the meniscus 12 by the glass coming from the end part 7 is thus facilitated, which makes it possible to increase the drawing speed.

(b) The zone or curtain 9 facilitates the glass return current circulating in the direction of the arrow H. This return current then divides, in known manner, into a return current in depth K and a current J feeding the meniscus.

(c) The increase in the speed of the return current causes the temperature of the rear of the end part to rise, which reinforces the said return current.

(d) The plane of separation formed in the end part 7 by the zone 9 extends as far as the surface and prevents the formation of a cold skin of glass which normally exists between the meniscus 12 and the wall 8. The result is an improvement in the feed current G and the return current H. This factor also contributes to permit an increase in the drawing speed and prevent devitrification from occurring frequently in the shaded zone C as in the prior procedure, keeping in mind the stagnation of the glass at this point.

(e) In the conventional Pittsburgh process the meniscus is curved towards the wall 8, the maximum curvature being produced in the central portion of the kiln. By contrast, the invention makes it possible to obtain a meniscus 12 which is symmetrical in relation to the plane of the sheet 11.

(f) The dividing surface between the direct feed current G and the return current H coincides with the surface B—B of the zone 9 (FIGURE 2), that is to say that it is vertical and flat, while in the conventional Pittsburgh process it is markedly and irregularly corrugated. This therefore makes a considerable contribution to improving the optical quality of the glass drawn.

(g) The heating of the glass and the greater speed of the glass following the direction of the arrow G offers the further advantage of preventing any devitrification of the glass along the wall of the debiteuse 3 over which this current of glass passes. This represents a considerable advantage, from the fact that numerous devices have already been proposed with this object, for instance a hollow debiteuse with interior heating or the like, in order to avoid devitrification and increase the drawing speed; but none of these prior devices has the simplicity and effectiveness of the device in accordance with the invention. This latter also permits a not negligible extension of the duration of operation without stopping of the machine, the stoppages being necessitated by the formation of the devitrified glass.

The heating bar 6 can be produced in numerous ways.

In the example in FIGURE 3 the bar 6 consists of a metallic tube 21 (for instance of molybdenum or a nickel-chrome alloy). The tube 21 is U-shaped. It is supported by its ends on the edges 22 of the kiln 1 and traverses the bath 2 at the desired depth.

In the central portion of the tube 21 is accommodated a refractory tube 23 containing a coiled electrical resistor 24 fed by sheathed conductors 25, the proper centering of the conductors 25 in the end arms of the tube 21 being ensured by insulating discs 26. The resistor 24 can be fed with low voltage current (1 to 10 volts, for instance), the linear power supplied being slight, as indicated (0.3 to 2 kw. per metre).

The tube 23 of refractory material helps to give the bar 6 a density close to that of glass and to strengthen it mechanically.

In a modification (FIGURE 4), the bar 6 has an outer tubular resistor 27 of a molybdenum, ballasted by an inner filling 28 of refractory material.

Thus, it would not be going outside the scope of the invention to make the walls 22 traversed direct by the heating bar 6, at the level provided for this latter to traverse the bath 2.

I claim:

1. In a process for the production of flat glass by the Pittsburgh process, in which a sheet of glass is drawn vertically from a bath of molten glass in a drawing kiln and a completely immersed drawbar is located adjacent but spaced from an end wall of the kiln and is located beneath the drawn sheet with a meniscus of molten glass directly above the drawbar forming the foot of the drawn sheet, and in which a direct current of molten glass directly feeds the meniscus and a further current rising between the drawbar and said end wall of the kiln feeds the rear of the meniscus and a return current between said further current and said end wall plunges toward the bottom of the kiln; the improvement comprising applying heat between said further current and said return current, at a location spaced between said drawbar and said end wall but no farther from said drawbar than three-quarters of the horizontal distance between the drawbar and the end wall, to establish a rising substantially vertical thin zone of hotter glass of lower viscosity than the remainder of the glass in the bath, said zone being substantially parallel to the drawbar and extending substantially full width of the kiln and having a height not exceeding 1.5 times the depth of the lower surface of the drawbar and being disposed between said further current and said return current thereby to establish a relatively straight and regular division between said further current and said return current substantially full width of the kiln.

2. A process as claimed in claim 1, characterized in that the temperature of said zone is about 5 to 10° C. above the temperature of the ambient glass, which is about 990° C.

3. In apparatus for the production of flat glass by the Pittsburgh process, in which a sheet of glass is drawn vertically from a bath of molten glass in a drawing kiln and a completely immersed drawbar is located adjacent but spaced from an end wall of the kiln and is located beneath the drawn sheet with a meniscus of molten glass directly above the drawbar forming the foot of the drawn sheet, and in which a direct current of molten glass directly feeds the meniscus and a further current rising between the drawbar and said end wall of the kiln feeds the rear of the meniscus and a return current between said further current and said end wall plunges toward the bottom of the kiln; the improvement comprising a horizontal heating bar immersed in the bath at a location spaced between said drawbar and said end wall but no farther from said drawbar than three-quarters of the horizontal distance between the drawbar and the end wall, said heating bar being disposed between said further current and said return current substantially parallel to the drawbar and extending substantially full width of the kiln and being immersed in the bath at a depth not exceeding 1.5 times the depth of the lower surface of the drawbar thereby to establish between said further current and said return current a rising substantially vertical thin zone of hotter glass of lower viscosity than the remainder of the glass in the bath and disposed between said further current and said return current so as to establish a relatively straight and regular division between said further current and said return current substantially full width of the kiln.

4. Installation as claimed in claim 3, characterized in that the heating bar is immersed in the glass at a horizontal distance from the drawbar between 10 and 25 cm., and at a depth between 5 and 40 cm.

5. Installation as claimed in claim 3, characterized in that the heating bar consists of a refractory tube in which is accommodated an electrical resistor.

6. Installation as claimed in claim 3, characterized in that the heating bar consists of a metallic tube ballasted by an inner lead of refractory material.

References Cited

UNITED STATES PATENTS

| | | | |
|---|---|---|---|
| 1,489,875 | 4/1924 | Whittemore | 65—90 |
| 2,274,986 | 3/1942 | Kilian | 65—90 |
| 3,151,201 | 9/1964 | Kilian | 65—203 |

S. LEON BASHORE, Primary Examiner

E. R. FREEDMAN, Assistant Examiner

U.S. Cl. XR.

65—135, 136, 203, 355, 356, 134